United States Patent [19]

Yasukawa et al.

[11] Patent Number: 4,688,441

[45] Date of Patent: Aug. 25, 1987

[54] GEAR ASSEMBLY FOR MATING WITH THIRD GEAR WITHOUT BACKLASH

[75] Inventors: Masao Yasukawa, Okazaki; Shuji Morita; Hiroya Fujita, both of Toyota, all of Japan

[73] Assignee: Toyota Jidosha Kabushiki Kaisha, Aichi, Japan

[21] Appl. No.: 848,307

[22] Filed: Apr. 4, 1986

[30] Foreign Application Priority Data

Apr. 23, 1985 [JP] Japan ............................ 60-059558[U]
Apr. 23, 1985 [JP] Japan ............................ 60-059559[U]

[51] Int. Cl.⁴ ............................................. F16H 55/18
[52] U.S. Cl. ........................................ 74/409; 74/440
[58] Field of Search ........................... 74/440, 409, 445

[56] References Cited

U.S. PATENT DOCUMENTS

| | | | |
|---|---|---|---|
| 1,746,178 | 2/1930 | Alexandrescu | 74/440 |
| 2,663,198 | 12/1953 | Cairnes | 74/409 |
| 2,902,879 | 9/1959 | Andersen | 74/440 |
| 2,966,806 | 1/1961 | Luning | 74/409 |
| 3,135,152 | 6/1964 | Bedinghaus | 74/409 |
| 4,630,496 | 12/1986 | Yasuoka | 74/440 |
| 4,640,147 | 2/1987 | Yasukawa et al. | 74/440 |

FOREIGN PATENT DOCUMENTS

| | | | |
|---|---|---|---|
| 48-2947 | 1/1973 | Japan . | |
| 48-34438 | 10/1973 | Japan . | |
| 55-158349 | 11/1980 | Japan . | |
| 56-160351 | 11/1981 | Japan . | |
| 61-1770 | 1/1986 | Japan . | |
| 792330 | 3/1958 | United Kingdom | 74/411 |

Primary Examiner—Cornelius J. Husar
Assistant Examiner—Peter M. Cuomo
Attorney, Agent, or Firm—Kenyon & Kenyon

[57] ABSTRACT

A gear assembly comprising two gears and a spring in the form of a C-shaped clip interconnecting the two gears. Two pins are provided on one of the two gears and the spring has two holes, one in each end thereof, whereby the spring can be carried by one gear in a prestressed state by means of the pin-and-hole connection. The other gear has a third pin thereon. The spring has a third hole into which the third pin is inserted. Thus the assembly work can be accomplished simply by resting the second gear on the first gear. An end of the third hole engages with the third pin to create a spring force necessary to provide nonbacklash mating with a third gear.

6 Claims, 10 Drawing Figures

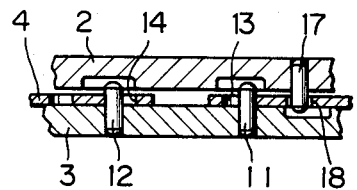
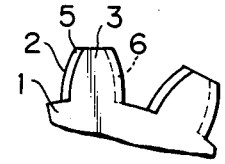
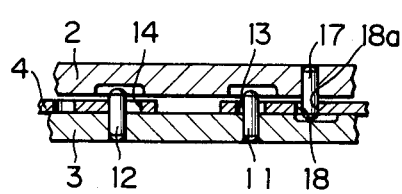
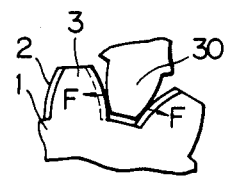
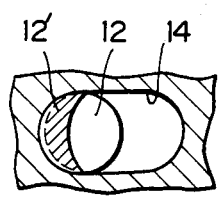
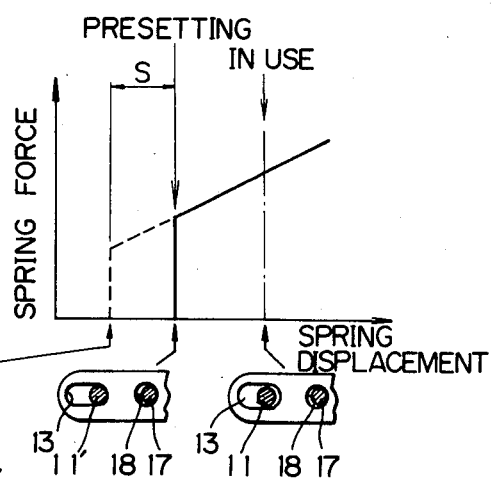
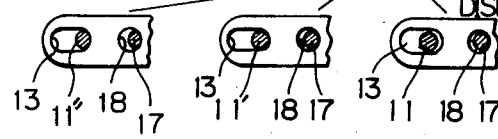

GEAR ASSEMBLY FOR MATING WITH THIRD GEAR WITHOUT BACKLASH

BACKGROUND OF THE INVENTION

1. Field of the Invention

This invention relates to a gear assembly constituted by a single gear to be mated with a third gear in such a manner that backlash therebetween is eliminated, to reduce noise caused by such a mating. The present invention can be widely applied in various mechanical fields.

2. Description of the Related Art

A conventional non-backlash gear assembly is known, in which the assembly comprises two gears having an identical gear tooth number and profile and a spring anchored at each end to the respective gears, to provide a circumferential biasing force that will tend to rotate the two gears in opposite directions, so that this gear assembly can be mated with a third gear in a non-backlash manner.

Several types of springs are used for providing a circumferential biasing force between the two gears to realize a non-backlash gear assembly. For example, a compression coil spring is used in the device shown in FIG. 2 of Japanese Examined Utility Model Publication (Kokoku) No. 48-34438 and in FIG. 1 of Japanese Unexamined Utility Model Publication (Kokai) No. 55-158349. A torsional coil spring is used in Japanese Unexamined Utility Model Publication (Kokai) No. 56-160351, and a C-shaped round steel spring is used in FIG. 1 of Japanese Examined Utility Model Publication (Kokoku) No. 48-34438 and in FIG. 3 of Japanese Unexamined Utility Model Publication (Kokai) No. 55-158349. Further, a hairpin-shaped spring is used in Japanese Examined Utility Model Publication (Kokoku) Nos. 48-34438 and 48-2947

A snap spring in the form of C-shaped clip is also known. The present invention is directed to a gear assembly having this type of C-shaped clip snap spring In a known non-backlash gear assembly including a spring in the form of a C-shaped clip, two circular holes are provided in the spring adjacent to either end thereof and each of the two gears has one pin. Thus each end of the spring can be connected to each gear by the pin and circular hole. This known type of gear assembly has a disadvantage in that the assembly operation is very difficult. Namely, it is very cumbersome to fit the holes to the pins. In the first step the spring is rested on the first gear, and the circular hole of one end of the spring is fitted to the pin on the first gear. This is very easy since both the first gear and the spring can be seen by the operator. In the second step, however, the second gear must be moved onto the first gear, to fit the pin on the second gear into the other hole of the spring. This is very cumbersome since the first gear, the spring and the other pin of the second gear cannot be seen because they are blocked by the second gear, and the operator must fit the other hole to the other pin by touch.

To solve the above difficulty in operation, an improved gear assembly has been proposed in Japanese Unexamined Utility Model Publication (Kokai) No. 61-1770 in which the pins are provided on one of the gears, for example, on the first gear, so that the C-shaped clip spring can be easily positioned and held on the first gear by inserting the pins into the respective holes of the spring. One of the holes is an elongated hole having a diameter larger than the pins, so that the spring can deform when an external force is applied thereto. On the other gear, for example, on the second gear, a C-shaped groove is provided corresponding to the C-shaped spring, to receive the spring in the groove. The spring can be automatically fitted in the groove of the second gear when the second gear is located on the first gear, so that one of terminal ends of the groove bears against the corresponding terminal end of the spring which is displaceable in the groove, resulting in the production of an elastic biasing force due to the presence of the spring between the gears.

However, in this gear assembly, which ensures an easy assembly, a problem arises in that forming the C-shaped groove on the second (or first) gear is relatively difficult. In general, such a curved groove can be formed by a milling cutter, however, since the C-shaped groove has a relatively small width, machining becomes complex and difficult.

Furthermore, in the gear assembly mentioned above, the elastic connection between the two gears is dependent on the spring force of the C-shaped clip spring alone. Therefore, in order to obtain a sufficient spring force, it is necessary to increase the thickness of the C-shaped clip spring, since the plane size of the C-shaped clip spring is limited by the size of the gears. However, if the thickness of the C-shaped spring is increased, it becomes very difficult to form the pin holes on the ends of the C-shaped spring by punching. Namely, the pin holes must be machined by drilling or other mechanical piercing. It is apparent that drilling takes more time than punching, since drilling must be effected for each individual spring, whereas punching can form pin holes in several C-shaped springs substantially at one time. In addition, drilling tends to produce burrs at the edges of the pin holes or tends to produce eccentric pin holes lacking a high precision. This results in a decrease in the surface contact area between the pin holes and the associated pins inserted therein, resulting in an increase in surface pressure therebetween. The increased surface pressure increases frictional wear of the contacting portions between the pins and pin holes.

SUMMARY OF THE INVENTION

Accordingly, the primary object of the present invention is to provide a simple gear assembly of two gears and a C-shaped spring, which assembly can be easily manufactured and assembled by using a knockout pin instead of the conventional C-shaped groove.

Another object of the present invention is to provide a gear assembly having a plurality of identical C-shaped springs which contribute to an increase of the elastic biasing force between the two gears.

In order to achieve the above objects according to the present invention, there is provided a gear assembly adapted for mating with a third gear in a non-backlash manner, the assembly comprising: first and second gears that are coaxially and relatively rotatable, the gears having the same number of teeth, with identical tooth profiles, on the peripheries thereof and having opposing inner surfaces.

One of the gears is provided with two fixed pins standing on the inner surface thereof, and the other gear is provided with a knockout pin standing on the inner surface thereof. A spring is placed between the two gears to connect them with a circumferential spring bias, the spring having at least three pin holes corresponding to the fixed pins and the knockout pin on the first and second gears, at least one of the pin holes corresponding to one of the two fixed pins on one of the gears, the pinhole having a dimension, taken circumferentially of the assembly, greater than the diameter of the associated pin, so that the spring can be elastically deformed by the application of a force thereto.

The spring is carried by one of the gears in a prestressed state caused by the mating of the pins on one gear with the corresponding holes of the spring.

The hole corresponding to the knockout pin on the other gear has a dimension, taken circumferentially of the assembly, greater than the diameter of the knockout pin, and the knockout pin abuts against one end of the knockout pin hole to cause an elastic deformation of the spring. The first and second gears together being adapted to mate with a common third gear under the elastic deformation of the spring to provide a non-backlash mating with the third gear.

According to one aspect of the present invention, the spring comprises a single C-shaped spring.

According to another aspect of the present invention, the spring comprises a plurality of identical springs, placed one upon the other, each spring having a C-shape.

Further features and advantages of the present invention will be described in greater detail in connection with a preferred embodiment of the invention and in reference to the attached drawings.

BRIEF DESCRIPTION OF THE DRAWINGS

FIG. 4 is a section taken along the lines IV—IV in FIG. 2, the assembly in a free condition;

FIG. 5 illustrates the teeth of the gears of the assembly in FIG. 4;

FIG. 6 is a section similar to FIG. 3, illustrating the assembly in a spring biased condition;

FIG. 7 illustrates the teeth of the gears of the assembly in FIG. 6, and a tooth of a third gear;

FIG. 8 illustrates a worn pin provided in the gear assembly of present invention;

FIG. 9 a diagram of characteristics of spring displacement with respect to spring force; and, FIG. 10 is an exploded perspective view of a different embodiment of the gear assembly according to the present invention.

DESCRIPTION OF THE PREFERRED EMBODIMENTS

Figure 1:
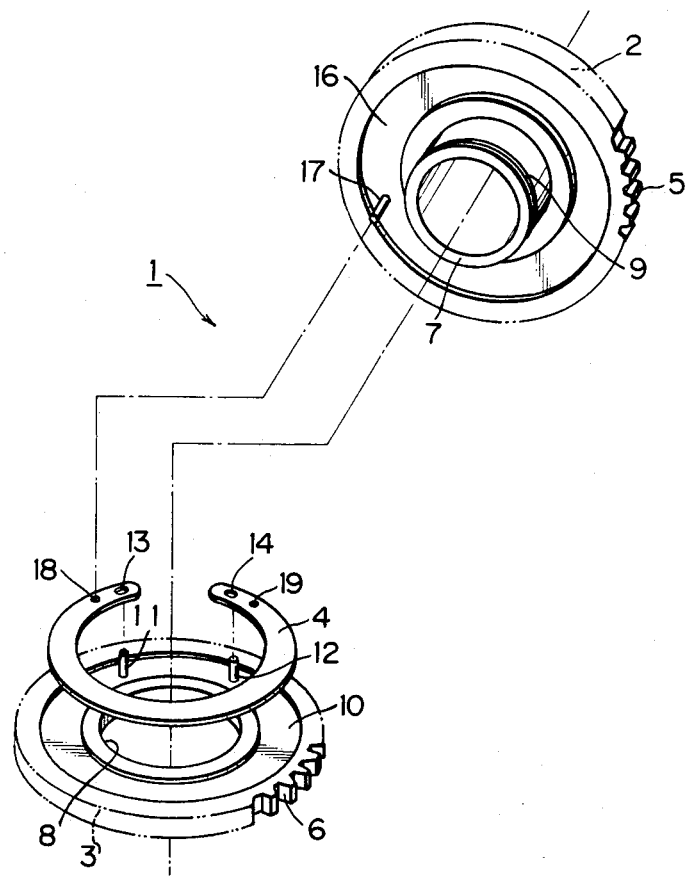
FIG. 1 is an exploded perspective view of the gear assembly according to the present invention.

In FIG. 1, a non-backlash gear assembly according to the present invention is generally indicated by the reference numeral 1. This assembly 1 comprises a first main gear 2, a second subgear 3, and a spring 4 in the form of a C-shaped clip. The gear assembly 1 as a whole constitutes a single gear means which can be mated with a third gear 30, as shown in FIG. 7. The first gear 2 and the second gear 3 have conventional teeth 5 and 6 on their peripheries, respectively. The tooth profile and the number of the teeth 5 and 6 of each gear 2 and 3 are identical. The spring 4 has a shape such as is used for a known retaining ring or snap ring, and comprises a flat and generally circular arcuate shape.

Figure 3:
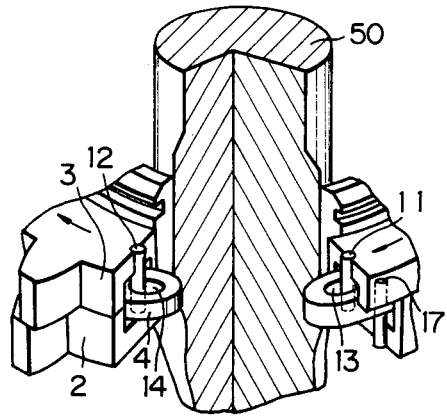
FIG. 3 is a partially broken perspective view of the gear attached to a cam shaft.

The first gear 2 has a cylindrical boss 7 at the central region thereof, to fit the first gear 2 onto a desired shaft (e.g., camshaft 50 in FIG. 3). The boss 7 projects coaxially from the first gear 2, the center bore 8 of the second gear 3 being slidably fittable onto the external peripheral surface of the boss 7. Thus the first gear 2 and the second gear 3 can be arranged so as to be coaxially and relatively rotatable.

An annular groove 9 is provided near the free end of the boss 7 for receiving a snap ring (not shown) to retain the second gear 3 on the first gear 2 in the axial direction.

The first gear 2 has a recessed inner surface 16 on the side from which the boss 7 projects and the second gear 3 has a recessed inner surface 10, these surfaces 10 and 16 opposing each other when the second gear 3 is fitted to the boss 7 of the first gear 2.

Figure 2:
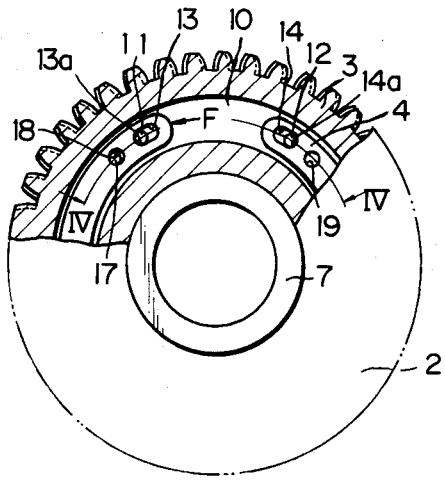
FIG. 2 is a plane view, partly sectional, of the gear assembly of FIG. 1.

Two pins 11 and 12 are provided on the inner surface 10 of the second gear 3. The spring 4 in the form of a C-shaped clip has holes 13 and 14 adjacent to either end thereof. The spring 4 can be carried by or rested on the second gear 3 in a prestressed state, namely, in an expanded condition relative to its free initial configuration, with the pins 11 and 12 engaged with the holes 13 and 14 of the spring 4. In this embodiment, the spring 4 and the pins 11 and 12 are designed in such a manner that the spring 4 is substantially concentrically arranged around the boss 7, as clearly shown in FIG. 2. Further, the holes 13 and 14 are elongated holes, the longer side of which extends circumferentially of the spring 4, i.e., circumferentially of the assembly. Alternatively, one of the holes 13 and 14 can be a circular hole, the diameter of which substantially conforms to the pin 12. Accordingly, the pins 11 and 12 can abut against the circumferentially inner wall ends 13a and 14a of the corresponding holes 13 and 14, as shown in FIGS. 2 and 3, when an external force is not applied to the assembly after the spring 4 is mounted on the second gear 3. When an external force is applied to the spring 4 in the counterclockwise direction as represented by the arrow F in FIG. 2, the spring 4 elastically deforms within the limit determined by a difference in dimension between the hole 13 and the pin 11. As the spring 4 is fixed at the other end by engaging the pin 12 with the hole 14, such elastic deformation of the spring 4 provides a reaction force to that external force. In this sense, the hole 14 can be a circle into which the pin 12 can be snugly inserted, since the hole 14 is considered to be a fixed end in the illustrated embodiment. If the hole 13 is considered to be the fixed end, the hole 13 can be a circle into which the pin 11 can be snugly fitted. It will be clear from the above description that this reaction force will allow the assembly to mate with the third gear 30 in a non-backlash manner.

The main gear 2 has a knockout pin 17 on the recessed surface 16.

The spring 4 has a third hole (knockout pin hole) 18 corresponding to the knockout pin 17. Preferably, an additional third hole 19 is also provided in the spring 4 in a symmetrical arrangement with the first mentioned third hole 18. This is to ensure that the spring can be assembled on the second gear 3 even if the spring is put in upside down. Namely, the provision of the two third holes 18 and 19 in a symmetrical arrangement enables the spring to be assembled regardless of which side thereof is up or down. Since the third hole 19 is provided only for convenience in assembly, as mentioned above, it is not essential.

The pin 17 is adapted to connect the two gears 2 and 3 through the spring 4 when the gears 2 and 3 are superimposed on each other. Namely, the main or first gear 2 is connected to the sub or second gear 3 through the pin 17, the hole 18 (or 19), the spring 4, the hole 14, and the pin 12. The hole 18 (or 19) has a larger inner diameter than the diameter of the knockout pin 17.

The gear assembly of the present invention can be assembled as follows.

The main gear 2 is attached to the camshaft 50. Before the second gear 3 is assembled on the main gear 2, the spring 4 is attached to the second gear 3 by engaging the pins 11 and 12 of the second gear in the corresponding holes 13 and 14 of the spring 4. That is, when the pins 11 and 12 are inserted in the associated elongated holes 13 and 14 of the spring 4, the spring is expanded in a prestressed state, so that a gap between the opposite ends of the spring 4 is enlarged, as mentioned above. This provides the scissors force of a so-called scissors gear.

The second gear 3 on which the spring 4 is provisionally attached is put on the first (main) gear 2 in such a way that the knockout pin 17 of the first gear 2 is inserted in the hole 18 of the spring 4. The insertion of the knockout pin 17 in the hole 18 is shown in FIG. 4, in which the knockout pin 17 is free in the hole 18, since the hole 18 is slightly larger than the pin 17. FIG. 5 shows a gear teeth relationship between the main and second gears 2 and 3 when connected to each other in the position shown in FIG. 4.

When the scissors gear thus obtained by the two gears 2 and 3 and the spring 4 connecting the two gears is engaged by a third gear 30 and mated therewith, as shown in FIG. 7, the pin 17 comes into contact with one end, i.e., an inner end 18a of the corresponding hole 18 of the spring 4, so that the teeth 5 and 6 of the gears 2 and 3 are elastically expanded by the teeth of the mating gear 30 in accordance with the preset force of the spring 4. As a result of this expansion of the gear teeth 5 and 6, the pin 11 separates from the end 13a of the associated elongated hole 13 and becomes free. This free state is shown in FIG. 6. Namely, the spring 4 is brought from the position shown in FIG. 4 to the position shown in FIG. 6 by the pin 17 when the scissors gear meshes with the third gear 30. For a more detailed explanation, the main gear 2 is free from the C-shaped spring 4 within a predetermined amount of play, in FIG. 4, in which the scissors gear of the present invention is not yet meshed with the third gear 30.

This play, namely the play between the pin 17 and the hole 18 is less than the distance between the adjacent teeth 5 or 6 of the first or second gear 2 or 3.

Thus each tooth of the second gear 3 is superimposed on each tooth of the first gear 2 with a slight displacement therebetween and a gap is present between adjacent sets of the superimposed teeth, as shown in FIG. 5.

When the gear assembly is mated to the third gear 30, each tooth of the third gear 30 can be forced into that gap between the adjacent sets of the superimposed teeth of the gear assembly, with the result that the teeth of the third gear 30 push the teeth 6 of the second gear 3 in the counterclockwise direction, as shown in FIG. 7, causing the end 18a of the hole 18 of the spring 4 to push against the pin 17 of the first gear 2. The spring 4 then elastically deforms and the end wall 13a of the hole 13 is released from the pin 11, as shown in FIG. 6. The spring 4, therefore, effects a reaction force to the second gear 3, as indicated by the arrow F. As the second gear 3 is freely rotatable relative to the first gear 2, the teeth 6 of the second gear 3 are always in contact with the teeth of the third gear 30, so that each tooth of the third gear 30 is clamped between each tooth 5 of the first gear 2 and each tooth 6 of the second gear 3, even when backlash is provided between the first gear 2 and the third gear 30. Thus non-backlash mating is accomplished and noise is reduced.

As can be understood from the above, when the gear assembly, i.e., the scissors gear, having the main gear and the second gear, which have teeth slightly separated from the teeth of the main gear by an elastic force, is meshed with a mating gear (third gear), the scissors gear, which has been in a preset position (a provisional position) in which a spring force, i.e., a scissors force, is not produced, comes to a use position in which the necessary scissors force, i.e., the spring biasing force, is produced. The amount of play between the reset position and the use position depends on the shift or deviation between the teeth of the first and the second gears at the preset position.

Note, the amount of play must be small in view of the gear teeth of the third gear 30 to be meshed therewith. However, if there is a small amount of play, and the pin 12 (or 17) becomes worn, as shown at 12' in FIG. 8, a slight displacement of the contact point between the pin 12 (or 17) and the hole 14 (or 18) will result and the amount of play is easily reduced to zero. This loss of play causes the presetting pin 11 to come into contact with the end wall of the elongated hole 13, so that the spring force of the spring 4 is received by the pin 11. This means a loss of spring bias, and accordingly, a loss of the scissors function of the gear assembly of the present invention.

To prevent this, the pins 12 and 17, which receive the load when the gears are in use, are preferably made of a high wear-resistance or abrasion resistance material or are subject to a wear or abrasion resistance surface treatment.

On the other hand, the pin 11 can be made of a material which has only a relatively small resistance to the dead or static load acting thereon in presetting and which can be easily worn in use. This is because the pin 11 is useful only in the presetting stage, as will be apparent from FIG. 6 and it can be dispensed with when the gear assembly is actually mated with the third gear. With this arrangement, in which the pin 11 is made of a material which tends to be easily worn as mentioned above, even when the pin 12 or 17 is worn and would otherwise cause a deterioration of the scissors function of the gears, the scissors function can be still maintained because the pin 11 will be worn to a larger extent than the pin 12 or 17, as can be seen in FIG. 9. In FIG. 9, the worn pins 11 are designated by 11' and 11", of which 11" suffers the most wear. The use of a soft pin 11 can provide a wear allowance S.

The material of which the pin 11 is made can be, for example, a metal that has not been subjected to a surface treatment, such as Al, Cu, copper alloy, or it can be made of a plastic or resin material.

Preferably, the pins 11 and 12, and the corresponding holes 13 and 14 have different diameters to enable the pins and the holes to be easily distinguished from one another, and thus prevent an incorrect assembly.

Figure 10:
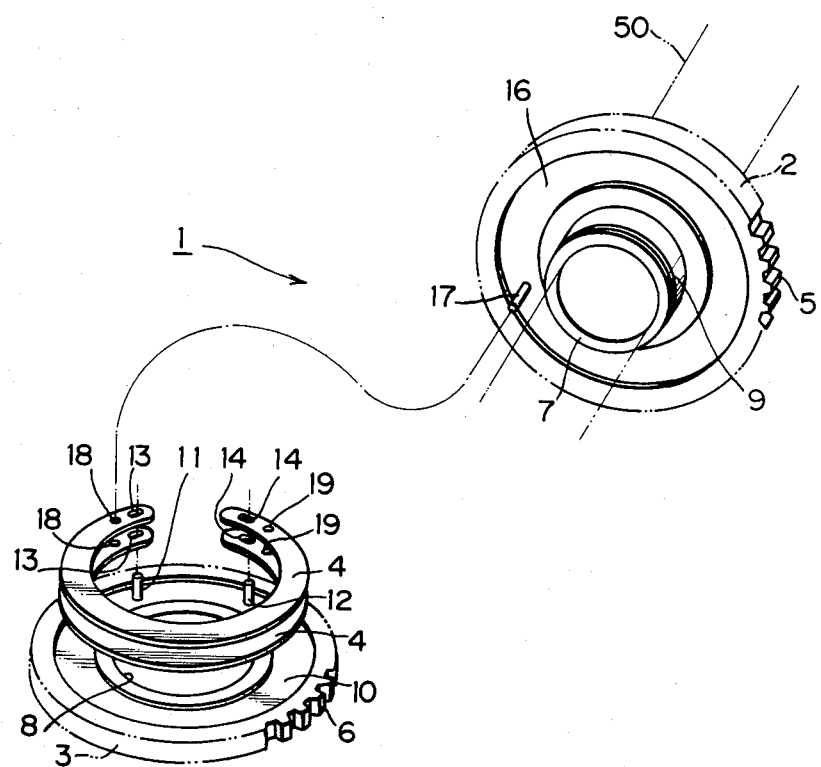

In a modified embodiment illustrated in FIG. 10, a plurality of identical C-shaped clip springs 4 are provided. In the illustrated arrangement, two springs 4 are provided but the number of springs is not limited and may be more than two. These springs 4 are aligned and located one upon the other. The spring force of the two springs 4 corresponds to that of the single spring 4 of FIG. 1. Alternatively, if each spring 4 in FIG. 10 has an identical spring force to that of the spring 4 in FIG. 1, the spring force of the combined springs 4 in FIG. 10 will be twice that of the spring force of the spring 4 in FIG. 1.

It will be easily understood that the increased number of springs 4 increases the spring force of the spring 4 as a whole. In other words, if the thickness of each spring 4 in the increased number of springs is decreased, the same spring force can be produced in total. The decrease in thickness of one spring 4 enables the holes 13, 14, 18 and 19 of the spring 4 to be formed by a punching press.

As mentioned hereinbefore, if the spring 4 has a relatively large thickness, the holes of the spring must be formed by drilling or the like.

It is obvious that various modifications can be made to the present invention without departing from the spirit and the scope of the present invention. For example, the pins 11 and 13 can be provided on the first gear and the knockout pin 17 can be provided on the second gear, contrary to the illustrated arrangement. Further it is obvious that the hole means can include means for engaging or securing the spring with the pin, such as a hole partly encircled by a hook.

As can be seen from the above description, according to the present invention, the connection between the main gear and the subgear can be effected by the knockout pin provided on one of the two gears, resulting in an easy production and assembly of the scissors gear. Since the spring can be provisionally attached to the sub gear (or main gear), the subassembly which has the subgear and the spring attached in advance thereto can be easily assembled with the main gear (or subgear) which has been already attached to the cam shaft. Thus a number of subassemblies can be prepared in advance for use on an assembly line, if necessary.

Furthermore, according to the present invention, by increasing the number of springs provided between the two gears, to ensure the necessary spring force, the thickness of one spring can be decreased. The increased number of springs also contributes to an increase in the total effective contact surface area between the pins and the associated pin holes, resulting in a decrease in the surface pressure thereat.

Furthermore, the provision of a plurality of springs ensures that any possible differences in spring force between the springs can be cancelled or effectively absorbed.

We claim:

1. A gear assembly adapted for mating with a third gear in a non-backlash manner, said assembly comprising:
   first and second gears arranged in a coaxially and relatively rotatable relationship, said gears having an equal number of teeth with an identical tooth profile on their peripheries and having opposing inner surfaces;
   one of said gears being provided with two fixed pins mounted in first and second holes of the inner surface thereof;
   the other gear being provided with a knockout pin mounted in a third hole of the inner surface thereof;
   spring means between the two gears for providing said gears with a circumferentially acting bias, said spring means having at least three pin holes for receiving the fixed pins and the knockout pin of the first and second gears, at least one of the pin holes corresponding to one of the two fixed pins on one of said gears having a longitudinal dimension, taken circumferentially of the assembly, greater than the diameter of the associated pin, so that the spring means can elastically deform upon application of a force to said spring means;
   said spring means being mounted on said two fixed pins of said one gear with two of the pin holes in a prestressed state;
   said third pin hole which receives said knockout pin mounted on said other gear having a longitudinal dimension, taken circumferentially of the assembly, greater than the diameter of said knockout pin;
   said knockout pin abutting against one end of said knockout pin hole to cause elastic deformation in said spring means, said first and second gears together being adapted to mate with a common third gear under said elastic deformation of said spring means in order to provide a nonbacklash mating with said third gear.

2. A gear assembly according to claim 1, wherein said spring means comprises a generally C-shaped single spring.

3. A gear assembly according to claim 1, wherein said spring means comprises a plurality of identical springs, placed one upon the other, each being generally C-shaped.

4. A gear assembly according to claim 1, wherein said at least one pin hole is an elongated hole, the longer side of which extends circumferentially of the gear assembly.

5. A gear assembly according to claim 1, wherein said knockout pin is made of a material which has less wear-resistance than materials of which the two fixed pins are made.

6. A gear assembly according to claim 1, wherein said spring means has an additional knockout pin hole arranged in a symmetrical fashion to said first mentioned knockout pin hole.

* * * * *